(12) United States Patent
Bentini et al.

(10) Patent No.: US 11,513,417 B2
(45) Date of Patent: Nov. 29, 2022

(54) RECONFIGURABLE INTEGRATED OPTICAL MICROSWITCH DEVICE

(71) Applicant: PROMETHEUS S.R.L., Bologna (IT)

(72) Inventors: Gian Giuseppe Bentini, Bologna (IT); Marco Chiarini, Faenza (IT)

(73) Assignee: PROMETHEUS S.R.L, Bologna (IT)

( * ) Notice: Subject to any disclaimer, the term of this patent is extended or adjusted under 35 U.S.C. 154(b) by 149 days.

(21) Appl. No.: 16/767,758

(22) PCT Filed: Jul. 26, 2019

(86) PCT No.: PCT/IB2019/056395
§ 371 (c)(1),
(2) Date: May 28, 2020

(87) PCT Pub. No.: WO2020/021503
PCT Pub. Date: Jan. 30, 2020

(65) Prior Publication Data
US 2021/0373415 A1 Dec. 2, 2021

(30) Foreign Application Priority Data
Jul. 27, 2018 (IT) .......... 102018000007577

(51) Int. Cl.
*G02F 1/295* (2006.01)

(52) U.S. Cl.
CPC ........ *G02F 1/2955* (2013.01); *G02F 2201/12* (2013.01)

(58) Field of Classification Search
CPC .... G02F 1/2955; G02F 2201/12; G02F 1/295; G02F 1/313
See application file for complete search history.

(56) References Cited

U.S. PATENT DOCUMENTS

2004/0247236 A1* 12/2004 Yoshimura ............... G02B 6/43
385/16

FOREIGN PATENT DOCUMENTS

WO 2016040049 A1 3/2016

* cited by examiner

*Primary Examiner* — John Bedtelyon
(74) *Attorney, Agent, or Firm* — Browdy and Neimark, PLLC

(57) ABSTRACT

A reconfigurable integrated optical microswitch device (1) comprises a base layer (100), an adhesive layer (102) made of non-conducting material, a first layer of driving electrodes (104) arranged above the non-conducting adhesive layer (102), a layer of electro-optical material (106) arranged on the first layer of driving electrodes (104), a plurality of waveguides (50) afforded in the layer of electro-optical material (106), and a second layer of driving electrodes (110), arranged above the layer of electro-optical material (106) and connected to the plurality of waveguides (50). The device further comprises a layer of dielectric insulating material (108) arranged between the layer of electro-optical material (106) and the second layer of driving electrodes (110).

9 Claims, 8 Drawing Sheets

RECONFIGURABLE INTEGRATED OPTICAL MICROSWITCH DEVICE

TECHNICAL FIELD

The present invention relates to the field of information and communication technologies, and in particular the field of broadband data transmission, for example on optical fibre.

The invention has been developed with particular regard, although not limitedly, to a reconfigurable integrated optical microswitch device.

PRIOR ART

The rapid development and growing implementation of fibre optic data transmission networks to premises ("Fibre to The Premises", FTTP), of optical urban networks ("Metropolitan Area Network", MAN) and of active optical cables for TV signals, or in general for video signals, has increased the need for devices capable of implementing an addressing and sorting of data flows in an increasingly efficient manner.

Opto-electronic switches, for example, have been replaced by optical switches capable of avoiding heterogeneous intermediate levels of signal transduction, in particular from optical to electronic and from electronic to optical, allowing a considerable speeding and simplification of transmission protocols and sorting of data transmitted over an optical network.

For example, Passive Optical Networks (PONs) are known, which allow several hundred users to share a single Optical Terminal (OLT) located in a central office. PONs are characterized by a point-to-multipoint architecture, meaning that the signal coming from an OLT is distributed to several tens of Network Optical Units (ONUs), which often coincide each with a user terminal in the network.

The technologies currently used for PONs, however, are based on fixed optical signal splitters (FOS) and therefore offer limited reconfiguration capability not only in the addition or removal of users of an ONU but also in the reconfiguration of the service for each user.

A further field of use of optical splitters is that of self-healing rings (SHRs) which constitute one of the most consolidated methodologies of protection of data networks and which allow the automatic recovery of error events of the networks themselves. Most of the optical splitters used today are passive. One example are passive splitters based on Planar Wave Guide Circuits (PLC), which are particularly economical but do not allow network flexibility.

Dynamic optical splitters are also known, obtained, for example, by inserting an optical amplifier in each output port of a passive optical splitter. This solution, however, in addition to being very expensive, is characterized by intrinsic limitations due to both the high noise levels generated by the amplification module, and the difficulty of controlling signal levels as the amplification efficiency depends on the level of the input signal.

A further example of a known dynamic optical splitter is an adaptive splitter which uses optical polarization and a mechanically moved quarter wave plate. This solution has all the drawbacks related to slowness, poor repeatability of movements of the rotation mechanism and the impossibility of independently controlling the levels of the different output channels.

Other solutions have also been proposed, for example based on temperature controlled fibre Bragg gratings (FBGs), but even these solutions have obvious limitations due to their considerable size and intrinsic sensitivity to external environmental variations (temperature, vibrations, etc.).

Furthermore, dynamic splitters have been proposed that use Opto-VLSI processors, in which the optical microprocessor can be based on liquid crystal technology or on MEMs technology with micro-mirrors moved mechanically. However, even these solutions have the great drawback of a slow optical processor and therefore, with both technologies, the switching frequencies of the individual elements cannot exceed, for physical reasons, tens of kHz.

The insufficient practicality and efficiency of the known solutions briefly described above often forces to the use of hybrid solutions, for example opto-electronic switches in which the light signal coming from a main path is converted into an electronic signal and, subsequently, the electronic signal is again converted into an optical signal on the secondary path channels.

The numerous researches and experiments conducted by the Owner have therefore highlighted the need for a reconfigurable optical switch capable of being used to dynamically and programmatically relocate the signal, in accordance with the users' real-time requirements and the distribution of services.

The need also arose for a redistribution and splitting system of a signal inside an optical network capable of transferring the optical power from the primary path to the secondary paths, preventing the use of optical attenuators and amplifiers, and of monitoring both primary and secondary paths simultaneously.

Finally, the need arose to provide a reconfigurable integrated optical microswitch device characterized by extremely reduced footprint and dimensions, thus suitable for miniaturization and integration into conventional opto-electronic systems.

This and other objects are achieved by the embodiments of the invention comprising the technical features defined in the main claim. The dependent claims outline preferred and/or particularly advantageous aspects of the invention.

DISCLOSURE OF THE INVENTION

One aspect of the solution according to the present invention provides a reconfigurable integrated optical microswitch device comprising a base layer, an adhesive layer made of non-conducting material, a first layer of driving electrodes arranged above the non-conducting adhesive layer, a layer of electro-optical material arranged on the first layer of driving electrodes, a plurality of waveguides obtained in the layer of electro-optical material, a second layer of driving electrodes, arranged above the layer of electro-optical material and connected to the plurality of waveguides, a layer of dielectric material arranged between the layer of electro-optical material and the second layer of driving electrodes.

With this solution it is possible to implement a redistributing and splitting system of an optical signal with a high efficiency, capable of handling a considerable flow of data and distributing them in a communication network at high speed.

Another aspect of the present invention envisages that the layer of dielectric insulating material comprises a plurality of openings arranged at the waveguides of the layer of electro-optical material.

Another aspect of the present invention envisages that the second layer of driving electrodes comprises a vertical driving line comprising a plurality of layers of conducting material arranged on the waveguides of the layer of electro-optical material, and a horizontal driving line comprising a plurality of conductive strips arranged on the layer of dielectric insulating material.

A further aspect of the present invention envisages that an end portion of each conductive strip is arranged in one of the plurality of openings of the layer of electro-optical material and connected to a respective waveguide of the layer of electro-optical material.

Yet a further aspect of the present invention provides that a portion of said planar surface is free of waveguides and comprises a pair of electrodes.

With this solution, it is possible to facilitate closing the lines of force of the electromagnetic field generated by the pairs of electrodes, limiting the cross talk of the force lines of the applied fields, in case the electro-optical substrate has a particularly large thickness.

A further aspect of the solution according to the present invention provides a method for switching an optical signal, characterized in that it comprises the following steps:
- arranging a substrate of electro-optical material comprising an array of waveguides, a first and a second layer of driving electrodes connected to the waveguides, and a layer of dielectric insulating material arranged between the layer of electro-optical material and at least the first or the second layer of driving electrodes,
- simultaneously distributing an optical signal through said waveguides, and
- predetermining and applying a plurality of electrical potentials on each waveguide for modifying the respective refraction indices and generating a plurality of individual wave fronts offset from each other according to a first predetermined configuration.

With this solution, it is possible to implement an Optical Waveguide Circuit capable of controlling the diffraction pattern produced by the transmitted light and thus control and modify, also with continuous variations and in a rapid and precise manner, the redistribution and splitting activity of the photonic micro-device. The redistribution of light intensity can therefore also take place in an analogical manner and the resolution of grey levels essentially depends on the background noise of the detection system. Another aspect of the present invention makes available a step of reprogramming in real time the plurality of electrical potentials, and generating a plurality of single wave fronts offset from each other according to a second predetermined configuration.

A further aspect of the present invention envisages that the diffraction pattern can be dynamically reprogrammed in real time in its time components, its space components and the distribution of relative intensities of the diffraction maximums and minimums.

BRIEF DESCRIPTION OF THE DRAWINGS

Further characteristics and advantages of the present invention shall become clearer from the following description, provided by way of example with reference to the appended figures wherein.

DETAILED DESCRIPTION

Figure 1:
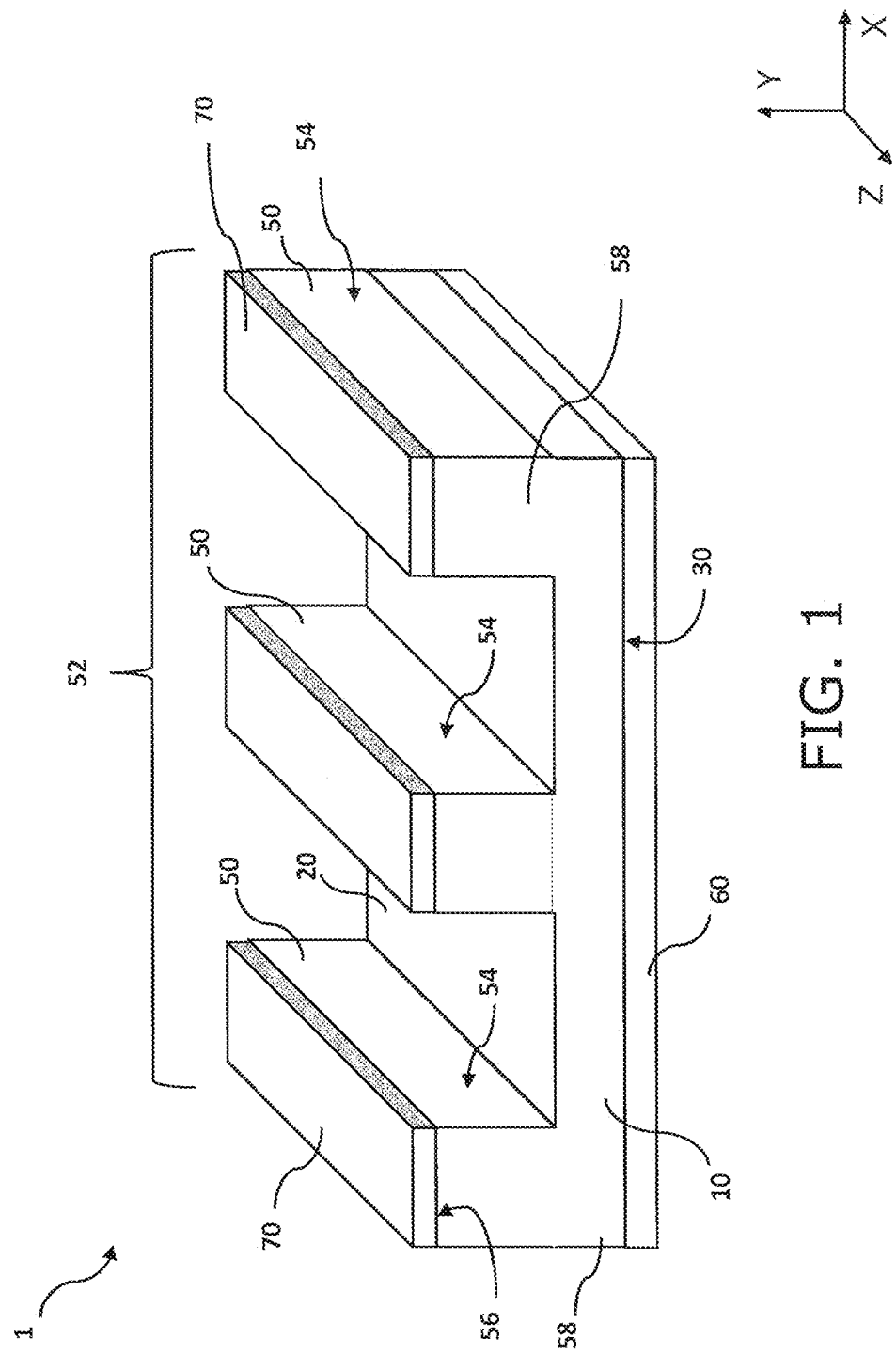
FIG. 1 is a schematic perspective view of one of the embodiments of the present invention.

With particular reference to the figures, an integrated reconfigurable optical microswitch device 1 comprises a substrate of electro-optical material 10, preferably, but not limited to, a monocrystalline electro-optical material. In the present description, the term "electro-optical material" means any material capable of modifying its refractive index in the presence of an external electric field, whose lines pass through said material.

The substrate of monocrystalline electro-optical material 10 may be made, for example, but not limited to, with one of the following materials selected from: Lithium Niobate (LiNbO3), Lithium Tantalate (LiTaO3), Potassium Titanylphosphate (KTP), KNSBN or SBN. Naturally, a man skilled in the art can also identify any further electro-optical materials as long as these materials have switching frequencies exceeding 10 GHz.

The electro-optical substrate 10 may be made with a flat structure in which two dimensions, length and width, are largely prevalent with respect to the third one, thickness, and it comprises at least one planar surface 20.

With reference to the embodiments shown in the accompanying figures by way of example, by width we mean the extension of the electro-optical substrate 10 along the axis X, by length the extension of the electro-optical substrate 10 along the axis Z, and by thickness the extension of the electro-optical substrate 10 along the axis Y.

Again with reference to the figures, the planar surface 20 lies on the plane defined by the axes X, Y and will be hereinafter referred to as the upper planar surface 20. The electro-optical substrate 10 also comprises a second planar surface 30, parallel to the planar surface 20, which will be hereinafter referred to as the lower planar surface 30. The reconfigurable integrated optical microswitch device 1 further comprises a plurality of waveguides 50, arranged at the upper planar surface 20 of the electro-optical substrate 10. The number of waveguides for each device 1 may widely vary from a minimum of three to several hundreds. The waveguides 50 may be made, for example, but not limitedly, by micro-machining in planar technology of the electro-optical substrate 10.

By the term "waveguide" we mean in the present description any linear structure capable of conveying and confining electromagnetic waves within a path comprised between the two ends, thus allowing a guided propagation thereof. In the context of broadband data transmissions, a waveguide is a means of transmitting a signal over a communication channel.

The waveguides 50 are arranged adjacent to each other and distributed in rows, or arrays, according to a longitudinal direction corresponding, in the accompanying figures, to the axis X, and can extend along the entire upper planar surface 20 according to a longitudinal direction corresponding, in the accompanying figures, to the axis Z. According to this configuration, the waveguides 50 provide an optical waveguide structure 52.

According to one of the possible embodiments of the present invention, the waveguides 50 extend along a direction corresponding to the direction of propagation of an optical signal which passes through the reconfigurable integrated optical microswitch device 1 of the present invention, and in particular that passes through the waveguides 50. In this sense, each waveguide 50 has an input end and an output end 58 of an optical signal.

The reconfigurable integrated optical microswitch device 1 may also comprise a pair of conductive elements, preferably a pair of electrodes, or armatures, or plates, each electrode being engaged to at least part of said optical waveguide structure 52, and in use, capable of generating a predetermined electric field as a result of the application of a predetermined potential difference between said electrodes.

In more general terms, and as will become clearer in the following, the axis of application of an electric field is preferably, but not limited to, oriented according to the most convenient crystallographic direction of the electro-optical substrate 10. However, a man skilled in the art may easily identify different orientations of said electric field with respect to that described and illustrated herein, without thereby departing from the scope of the present invention.

According to one of the possible embodiments of the present invention shown in FIG. 1, the reconfigurable integrated optical microswitch device 1 comprises a first conductive element, for example an electrode 60 engaged to the lower planar surface 30, and, particularly adapted, in use, to be connected to a ground potential. The first electrode 60 has a dimension substantially coincident with the dimension of the lower planar surface 30 of the electro-optical substrate 10.

Still with reference to FIG. 1, each waveguide 50 may comprise at least two side walls 54 and an upper wall 56. The lower wall of the waveguide 50 consisting of the electro-optical substrate 10 itself or of the lower planar surface 30.

The reconfigurable integrated optical microswitch device 1 may further comprise a plurality of second electrodes 70 engaged to at least part of the waveguides 50 of the electro-optical substrate 10, and particularly adapted, in use, to be connected to an electric voltage source. According to this configuration, each upper electrode 70 and the lower electrode 60 constitute, in use, the armatures of a respective plurality of capacitors, each of them being capable of creating an electric field which drives a respective waveguide 50.

The electrodes are made of any conductive material, preferably metal, but, if required, they may also be made of transparent conductive material such as, for example, Indium Tin Oxide (ITO), or Indium-Molybdenum Oxide (IMO).

On the upper wall 56 of each waveguide 50 is arranged one of the second electrodes 70, which may extend along the entire length of the waveguide 50. Preferably, the width of the electrode 70 is equal to, or at most smaller than the width of the optical structure 50.

Figure 2:
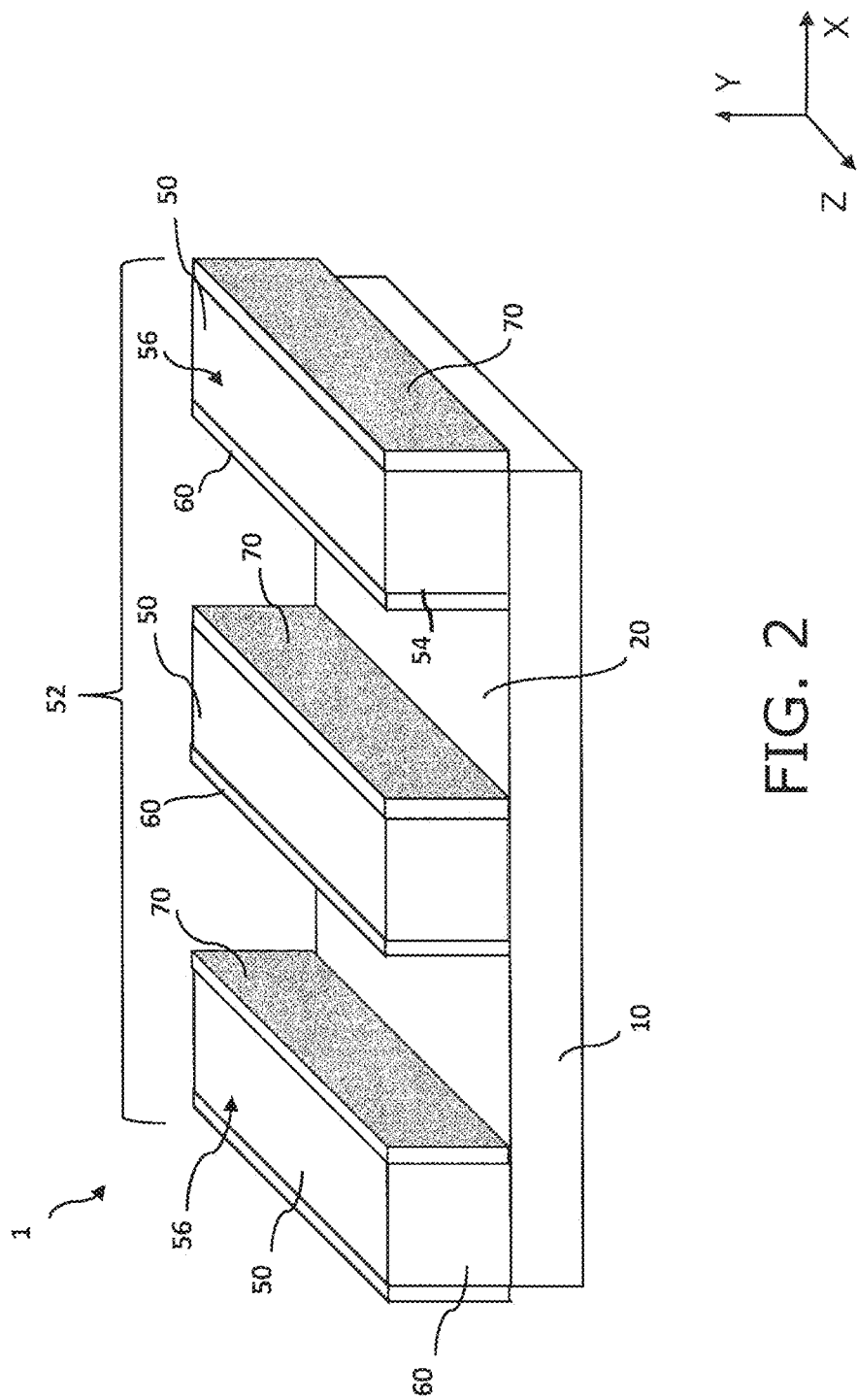
FIG. 2 is a schematic perspective view of a further embodiment of the present invention.
Figure 3:
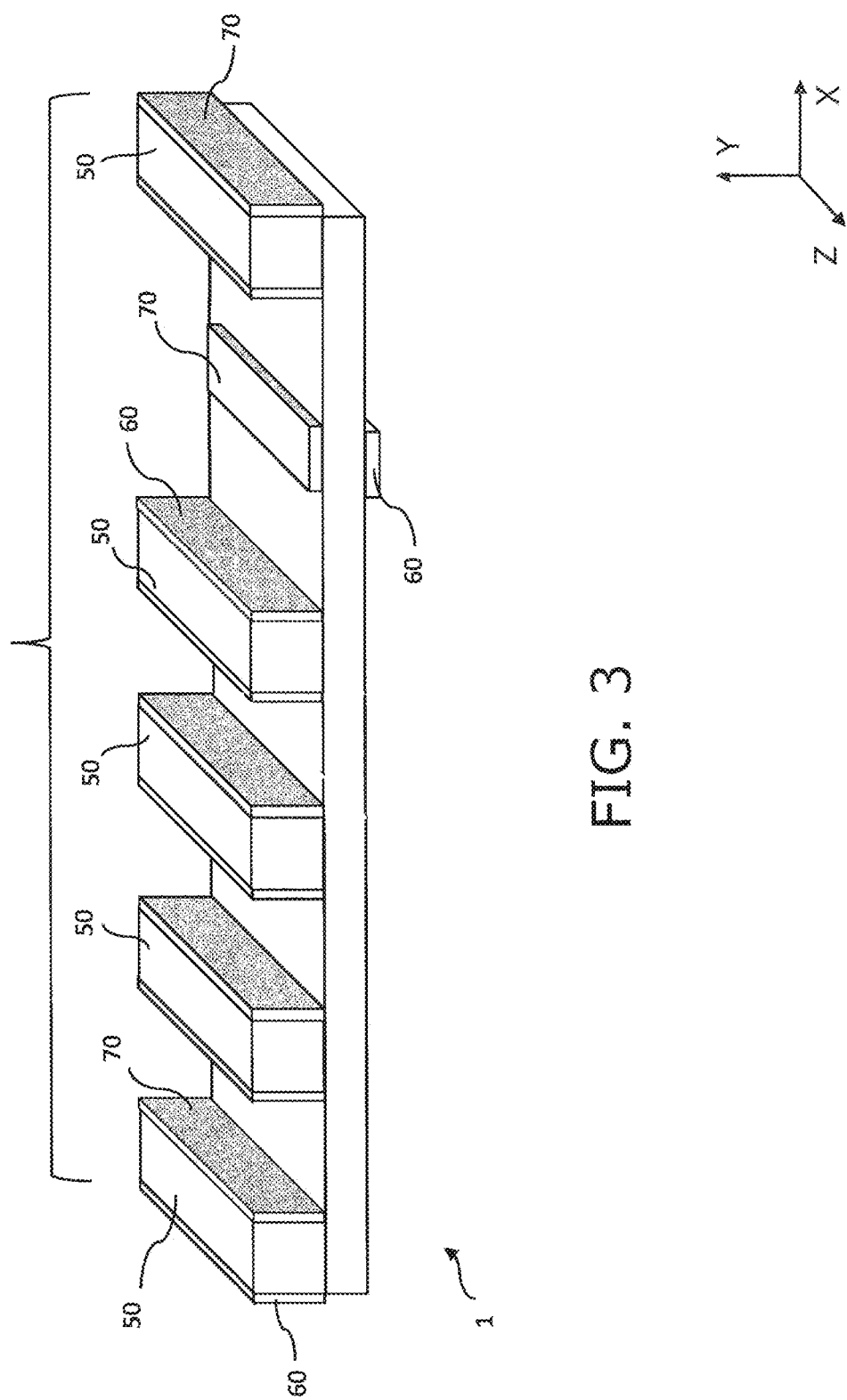
FIG. 3 is a schematic perspective view of another of the embodiments of the present invention.

The electrode 70 may be made according to any of the planar methodologies used in the field of Micro-Electro Optical Systems (MEOS), for example, but not limited to, it may be made by depositing and subsequent photolithography of metallic layers. According to another of the preferred embodiments of the present invention shown in FIG. 2, the reconfigurable integrated optical microswitch device 1 comprises a pair of electrodes associated with each waveguide 50. In particular, a first electrode 60 is engaged on one of the side walls 54 of the waveguide 50, and a second electrode 70 is engaged on the opposite side wall 54. The first electrode 60 is possibly adapted, in use, to be connected to a ground potential, and the second electrode 70 is particularly adapted, in use, to be connected to a voltage source. According to this configuration, each first electrode 60 and each second electrode 70 constitute, in use, the armatures of a respective plurality of capacitors, each of them being capable of creating an electric field which drives a respective waveguide 50.

As will be clear to a man skilled in the art, the arrangement of the armatures or electrodes 60, 70 may also vary with respect to the configurations described thus far and illustrated in the figures by way of example, without departing from the scope of the present invention, as long as such pair of armatures is capable of generating an electric field that drives a respective waveguide 50. For example, the reconfigurable integrated optical microswitch device 1 may comprise a plurality of first electrodes engaged to the lower surface 30 of the substrate at each waveguide 50, and a plurality of second electrodes 70 engaged to the upper wall of each waveguide. According to an alternative embodiment of the present invention, one or more waveguides 50 are free of both electrodes 60, 70.

According to a further embodiment of the present invention, the upper planar surface 20 of the electro-optical substrate 10 comprises at least one unworked portion, i.e. a portion without waveguides 50, called the "control zone". Such unworked portions however comprise an element of application of an electrical potential, for example, but not limitedly, a pair of electrodes 60, 70.

Advantageously, the "control zone" is capable of facilitating the closing of the lines of force of the electric field generated by the pairs of electrodes 60, 70 in case the electro-optical substrate 10 has a particularly large thickness. For example, but not limitedly, in some cases it is possible to provide a "control zone" located in the vicinity of each waveguide 50.

Figure 6:
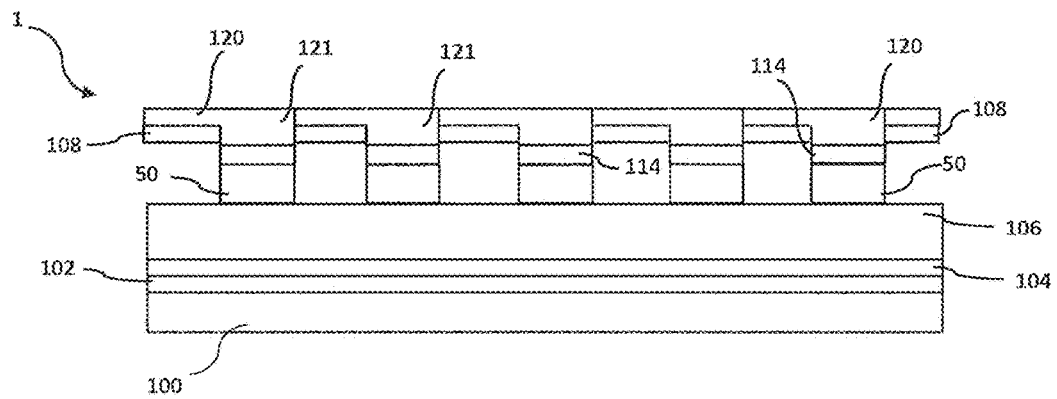
FIG. 6 is a schematic lateral view of a further embodiment of a multi-layer structure of a reconfigurable integrated optical microswitch device according to the present invention.
Figure 7:
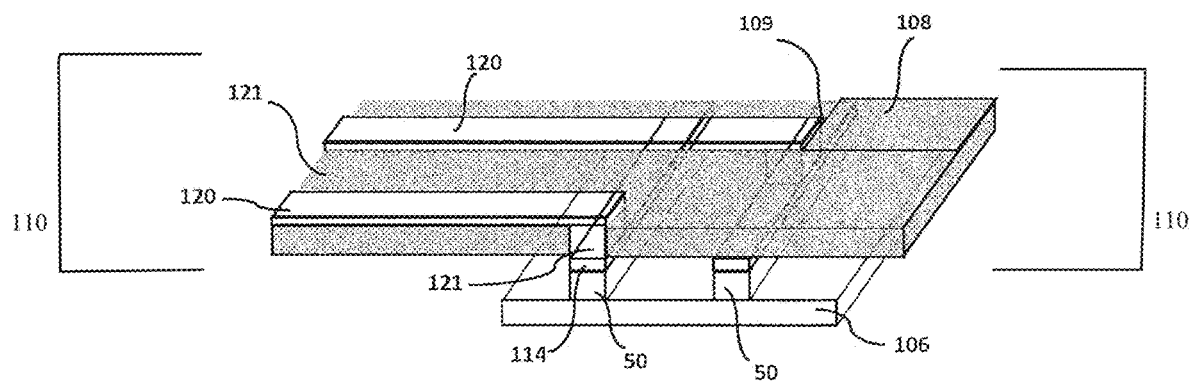
FIG. 7 is a schematic perspective view of the multi-layer structure of FIG. 6.
Figure 8A:
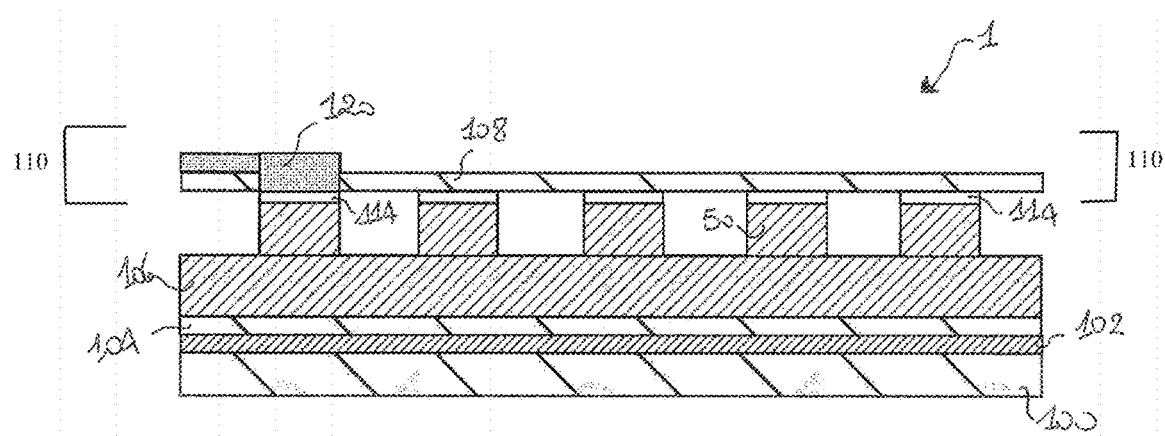
FIGS. 8a, 8b, 8c are views according to successive sections of the multi-layer structure of FIG. 7.
Figure 8B:
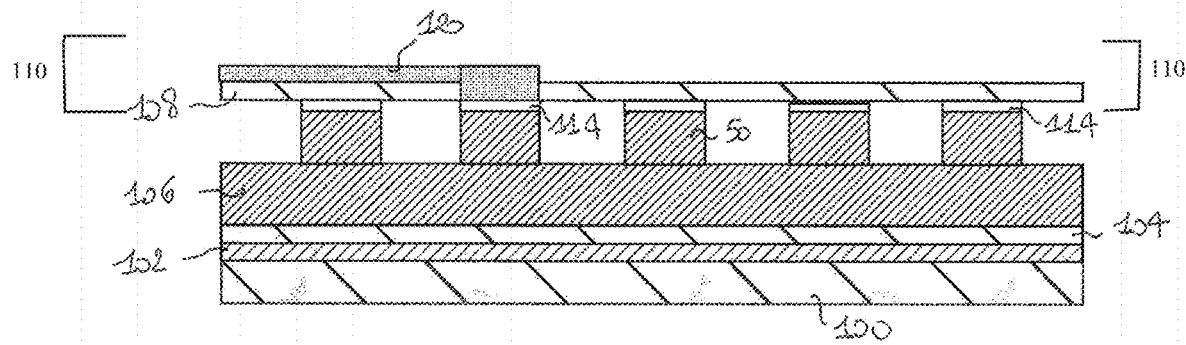
Figure 8C:
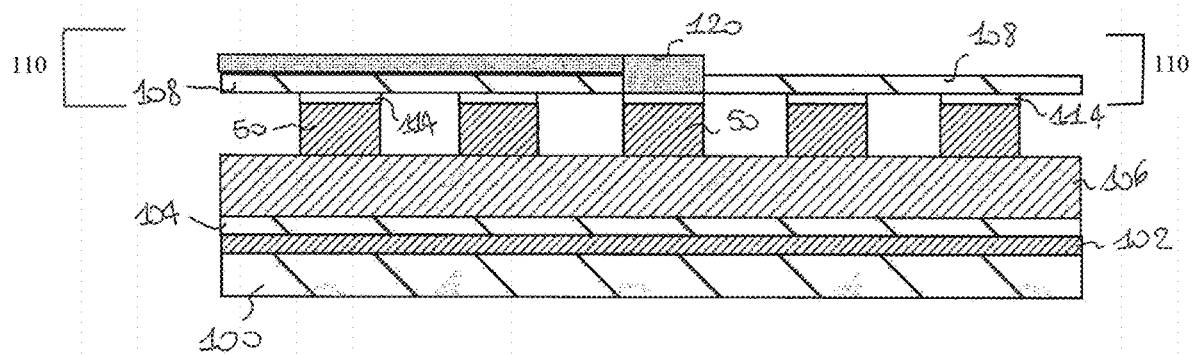

According to a further embodiment of the present invention, illustrated in FIG. 6, the reconfigurable integrated optical microswitch device 1 comprises a planar waveguide structure comprising a plurality of layers made with planar technology. The plurality of layers creates a multi-layer hybrid platform, in which the different layers perform different functionalities necessary both in the processing and production stage, and during the stage of use of the device.

The multi-layer hybrid platform thus created is composed of monocrystalline electro-optical layers, on which metal polycrystalline films are deposited, interspersed with layers of amorphous vitreous oxides and electro-optical single crystals.

In more detail, the multi-layer structure comprises a base layer 100, particularly adapted to guarantee mechanical stability for the structure. The base layer 100 can be made of silicon, or another material according to the use application of the device 1 of the present invention.

The multi-layer structure further comprises an adhesive layer 102 which, in the embodiment illustrated in FIG. 6, is arranged above the base layer 100. The adhesive layer 102 is typically made of non-conducting material.

The use of the non-conducting adhesive layer 102 is particularly advantageous in applications in which an optical signal with a wavelength greater than the one corresponding to the band gap of the semi-conductors, therefore the SWIR (Short Wavelength Infrared) and the MWIR (Medium Wavelength Infrared), is applied to the reconfigurable integrated optical microswitch device 1. In fact, at these wavelengths, both due to the plasmonic effect through a thin conductor film, and due to the tunnel effect, optical cross talks can be triggered with the base layer 100, which are instead blocked by the non-conducting adhesive layer 102.

The multi-layer structure comprises a first layer of driving electrodes 104, i.e. a film of conducting material, arranged above the non-conducting adhesive layer 102, and particularly adapted, in use, to act as a lower electrode. The layer of driving electrodes 104, preferably but not exclusively, has a dimension substantially coinciding with the dimension of the planar surface of the first electro-optical base layer 10.

The multi-layer structure comprises a layer of electro-optical material 106 arranged above the layer of driving electrodes 104. In the layer of electro-optical material 106 a plurality of waveguides 50 are obtained through micro-processing in planar technology. The multi-layer structure further comprises a layer of dielectric insulating material 108 arranged above the layer of electro-optical material 106.

According to a further characteristic of this embodiment, the layer of dielectric insulating material 108 comprises a plurality of openings 109, or connection windows, arranged at the waveguides 50 of the layer of electro-optical material 106.

Finally, the multi-layer structure comprises a second layer of driving electrodes 110, arranged above the waveguides 50 of the layer of electro-optical material 106.

As better highlighted in FIGS. 7 and 8a, 8b, 8c, the second layer of driving electrodes 110, can have a "cross comb" structure and comprise a layer of conducting material 114 arranged on the upper surface of each waveguide 50 realised in the layer of electro-optical material 106 and, particularly adapted, in use, to act as an upper electrode of the waveguide 50 on which it is arranged. Preferably, the layer of conducting material 114 can extend along the whole longitudinal length of the waveguide 50 and the width of the layer of conducting material 114 is less than or equal to the width of the waveguide 50.

The second layer of driving electrodes 110 further comprises a plurality of conductive strips 120, of different lengths, arranged according to an axial direction transversal to the axial direction of the waveguides 50. Each strip 120 comprises an end 121 that has a greater thickness with respect to the remaining portion of the strip 120, such for which the strip 120 assumes an overturned "L" shape. The thickness of the end 121 of the strip 120 is greater than the thickness of the layer of dielectric insulating material 108. The end 121 of each strip 120 is arranged within one of the connection windows 109 realised in the layer of dielectric insulating material 108. In this way the strips 120 are separated and isolated from the layer of electro-optical material 106 by means of the layer of dielectric insulating material 108, except at the connection windows 109 where the strips 120 are in contact with the layer of conducting material 114 arranged on the waveguides 50 of the layer of electro-optical material 106.

The conductive strips 120 of the layer of driving electrodes 110 cross the layer of conducting material 114 arranged on the waveguides 50 of the layer of electro-optical material 106 but without coming into contact with it except at the windows 109.

In other words, the second layer of driving electrodes comprises a vertical driving line comprising the layers of conducting material 114 arranged on the waveguides 50, and a horizontal driving line comprising the conductive strips 120 arranged on the layer of dielectric insulating material 108. The two vertical and horizontal driving lines enter into contact with each other only at the windows 109.

Thanks to this solution, it is possible to significantly reduce the electrical capacities at stake, so as to be able to apply to the device of the present invention control signals at high speed (>10 GHz). Furthermore, the planar arrangement of the layers prevents antenna effects that would instead make the device sensitive to the high frequency electro-magnetic noise of the control circuitry. Furthermore, and just as importantly, such configuration realized in planar technology, with parallel and non-serial processes, makes the industrial production of the device extremely effective.

Figure 9:
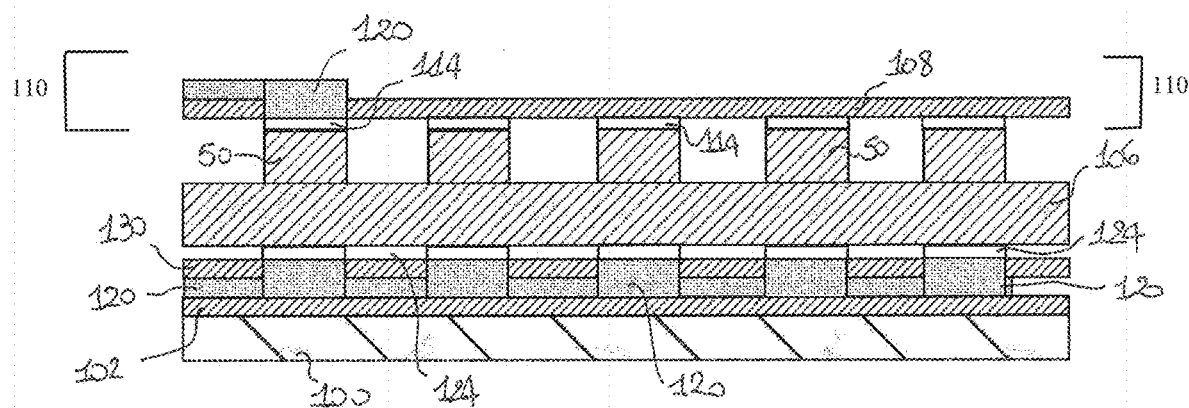
FIG. 9 is a schematic lateral view of a further embodiment of a multi-layer structure of a reconfigurable integrated optical microswitch device according to the present invention.

According to a further embodiment of the present invention illustrated in FIG. 9, the first layer of driving electrodes 104, i.e. the film of non-conducting material, arranged above the non-conducting adhesive layer 102, is realized like the second layer of driving electrodes 110 described above, i.e. a plurality of conductive strips 120, of a different length, with an end 121 that has a greater thickness with respect to the remaining strip portion, such as to assume an overturned "L" conformation.

Between the first layer of driving electrodes 104 and the layer of electro-optical material 106 a second layer of dielectric insulating material 130 is arranged. The second layer of dielectric insulating material 130 comprises a plurality of openings 109, or connection windows, preferably arranged at the waveguides 50 of the layer of electro-optical material 106.

Between the layer of dielectric insulating material 130 and the layer of electro-optical material 106 at each waveguide 50, a layer of conducting material 124 is arranged, particularly adapted, in use, to act as the lower electrode. Preferably, the layer of conducting material 124 can extend along the whole length of the waveguide 50 and the width of the layer of conducting material 124 is less than or equal to the width of the waveguide 50.

In this solution, the lower driving electrodes comprise a vertical driving line comprising the layers of conducting material 124 arranged at the waveguides 50, and a horizontal driving line comprising the conductive strips 120 arranged on the layer of dielectric insulating material 108. The two vertical and horizontal driving lines enter into contact with each other only at the windows 109.

According to another of the embodiments of the present invention, not illustrated, the non-conducting adhesive layer 102 is arranged above the layer of driving electrodes 104.

In this case, the insulating function previously described is to the advantage of the layer of electro-optical material 106, in which the luminous signal must remain confined, and to the disadvantage of the base layer 100. According to this configuration, the base layer 100 must be made of a material that has a predetermined affinity with the material of the layer of driving electrodes 104, in order to allow the 'spontaneous' adhesion of the base layer 100 to the layer of driving electrodes 104.

Figure 10:
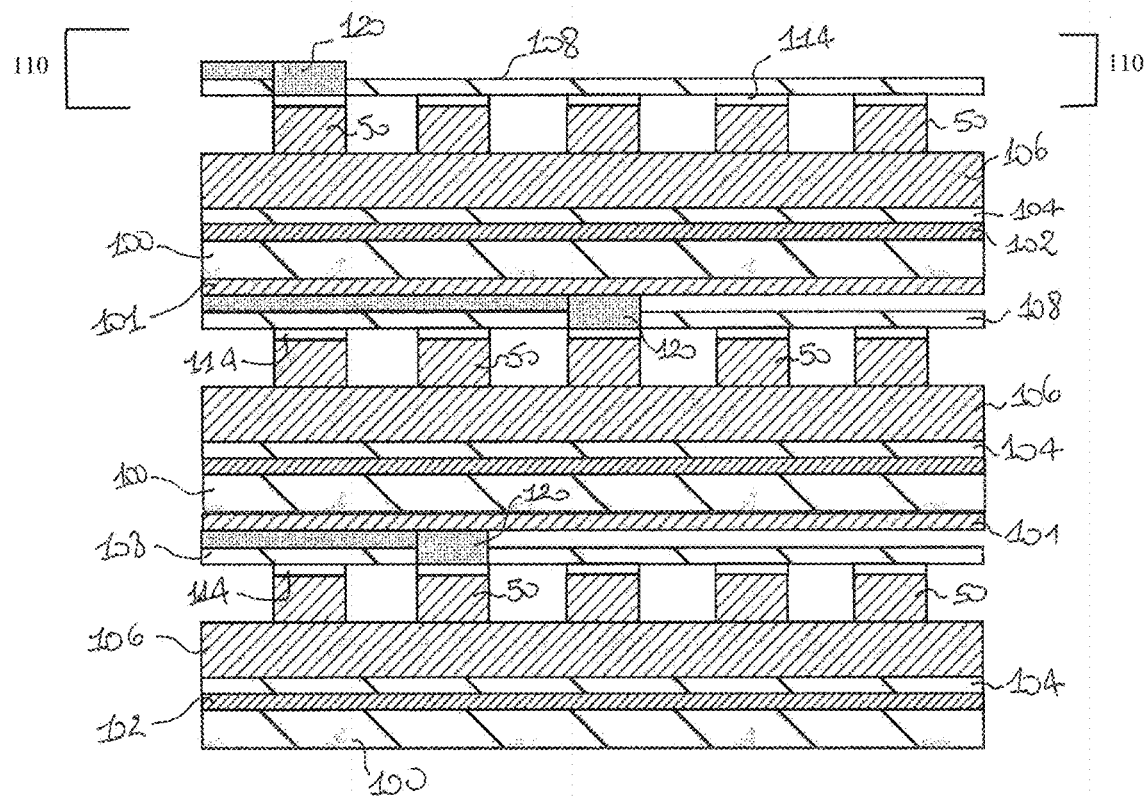
FIG. 10 is a schematic lateral view of a reconfigurable integrated optical microswitch device comprising a plurality of stacked multi-layer structures.

According to a further alternative embodiment of the present invention,

According to a further embodiment of the present invention, illustrated in FIG. 10, the reconfigurable integrated optical microswitch device 1 comprises a plurality of multi-layer structures, each composed of a plurality of layers as previously described. The multi-layer structures are arranged on top of each other, i.e. stacked. Preferably, but not necessarily, between each base layer 100 of a multi-layer structure and the second layer of driving electrodes 110 of the adjacent multi-layer structure, a further adhesive layer 101 is arranged, made of a non-conducting material.

This stack configuration produces a two-dimensional modulation architecture that allows the dimensions of the device 1 to be substantially improved, and the switching capacity of the final stacked device to be multiplied.

Furthermore, the diffraction pattern produced by the device passes from one-dimensional to two-dimensional and assumes totally different characteristics from the one-dimensional case, offering the opportunity to process images, square the processing capacity, etc.

Figure 4:
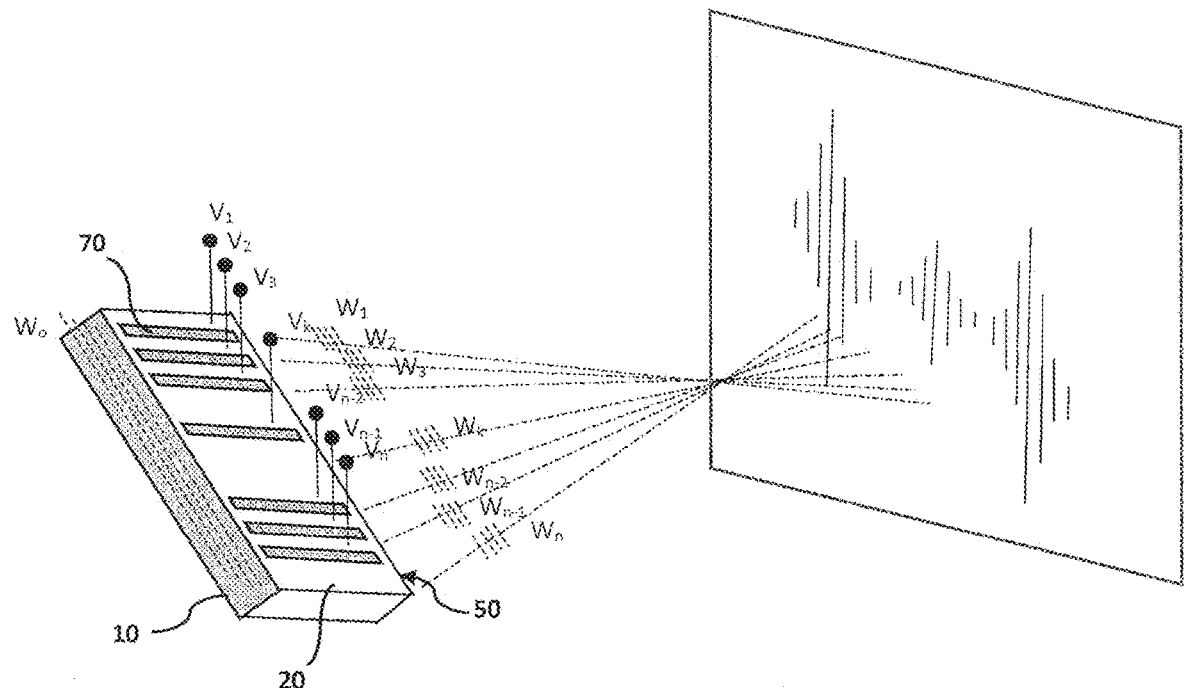
FIG. 4 is a schematic perspective view of one of the possible embodiments of a step of the method of the present invention.

In use, with particular reference to FIG. 4, a substrate of electro-optical material 10 is arranged, provided with a planar surface 20, in which an array of waveguides is arranged at the planar surface 20 of the electro-optical substrate 10, and a plurality of electrodes 70 is engaged to respective waveguides 50.

Thus, a wave front Wo of an optical signal is simultaneously distributed to the input of said array of waveguides 50. Preferably, but not limitedly, the optical signal is distributed through an injection lens (not shown).

Subsequently, predetermined electrical potentials $V_1$, $V_2$, $V_3$, ..., $V_k$, ... $V_{n-2}$, $V_{n-1}$, $V_n$ are applied on said electrodes 70 to modify in a controlled manner the refractive index of each of said waveguides 50, and generate a plurality of single wave fronts $W_1$, $W_2$, $W_3$, ..., $W_k$, ... $W_{n-2}$, $W_{n-1}$, $W_n$ offset from each other in output from the waveguides 50. The array of waveguides 50 produces at the output, in far field, a diffraction pattern characterized by a successive series of maximum and minimum intensity, in which the different intensity maximums correspond to different channels of the secondary optical path.

The application of an electric field through the pair of electrodes 60, 70 on a waveguide 50 causes a variation of the refractive index of the electro-optical material of which this waveguide 50 is made and, accordingly, causes a modification of the diffraction pattern at the output of the waveguide, and allows the dynamically redistribution of the intensity of the signal to the single addressed channels. The redistribution of the signal intensity in output from the waveguide array can therefore also take place in an analogical manner.

Figure 5:
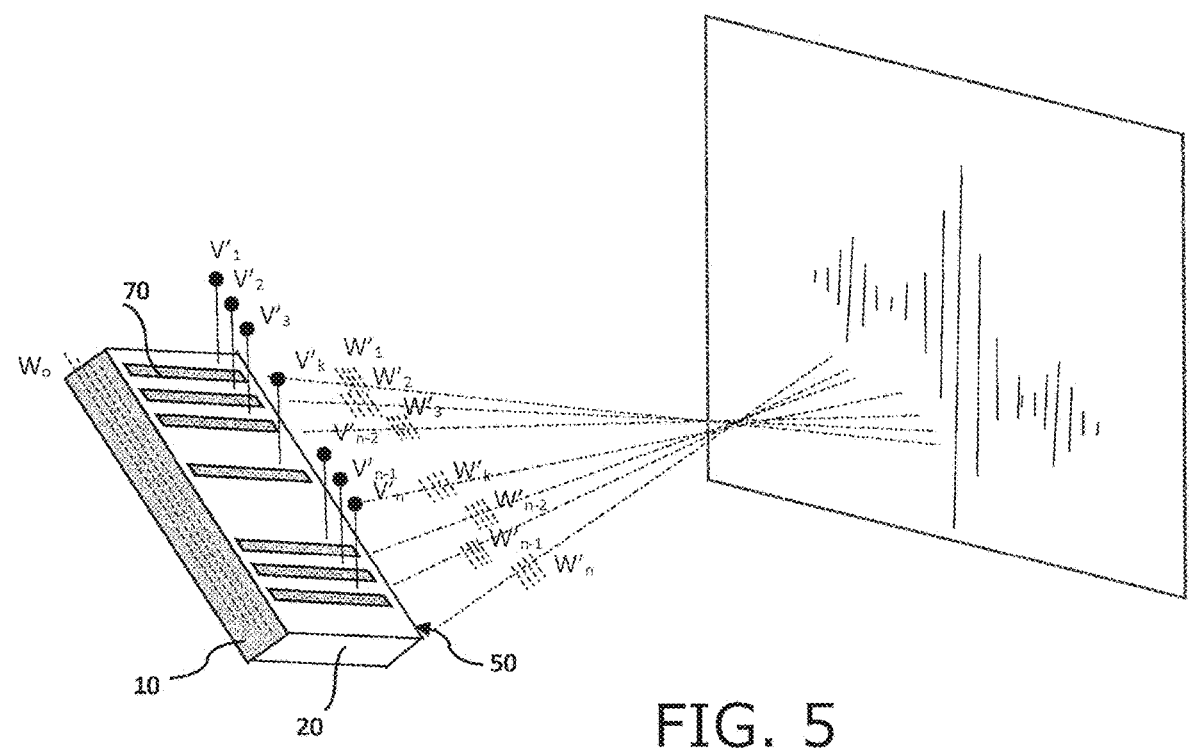
FIG. 5 is a schematic perspective view of one of the possible embodiments of a step of the method of the present invention.

As illustrated in FIG. 5, it is possible to apply the same wave front Wo of an optical signal simultaneously to the input of the same array of waveguides 50 but apply electrical potentials $V_1$, $V'_2$, $V'_3$, ..., $V_k$, ... $V'_{n-2}$, $V_{n-1}$, $V'_n$ to respective waveguides 50 with different values with respect to the values of the electrical potentials $V_1$, $V_2$, $V_3$, ..., $V_k$, ... $V_{n-2}$, $V_{n-1}$, $V_n$ of the example described above and illustrated in FIG. 4.

In this case, the result is the generation of a plurality of single wave fronts $W'_1$, $W'_2$, $W_3$, ..., $W'_k$, ... $W'_{n-2}$, $W'_{n-1}$, $W'_n$ offset with respect to each other but different from the previous example, so that the diffraction pattern generated in the far field is different from the one obtained in the previous example. This phase shift is in fact due to the different value of the refractive index generated by the different electric potentials $V'1$, $V'_2$, $V'_3$, ..., $V'_k$, ... $V'_{n-2}$, $V'_{n-1}$, $V'_n$ applied to each of the waveguides 50 that make up the optical waveguide structure 52 and made on the electro-optical substrate 10.

The reconfigurable integrated optical microswitch device allows a dynamically reprogrammable diffraction pattern to be reproduced in real time in its time components, its space components and the distribution of relative intensities of the diffraction maximums and minimums.

Figure 11:
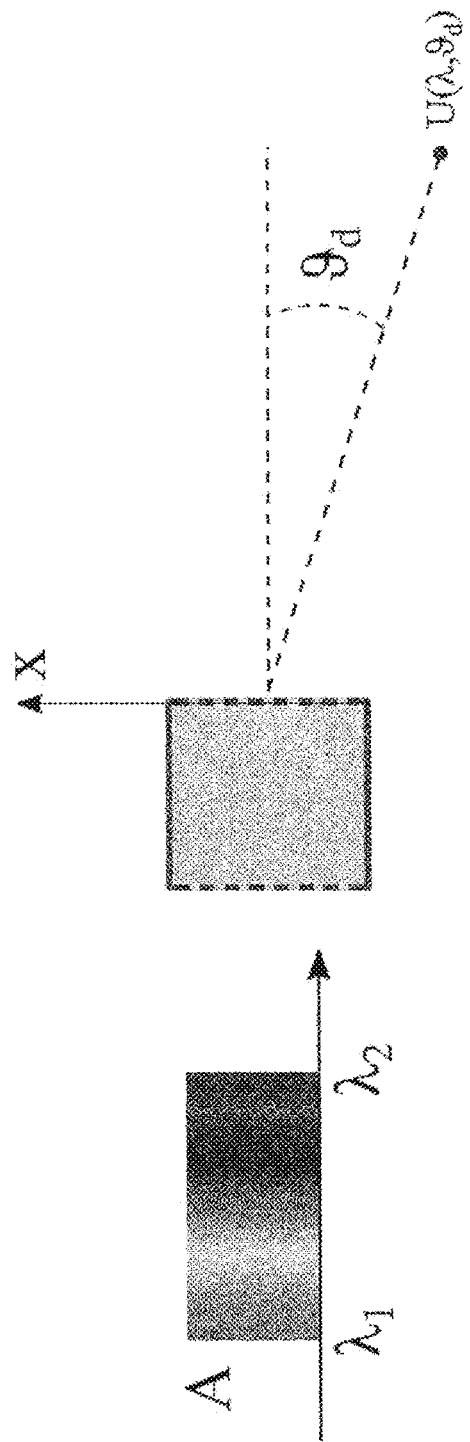
FIG. 11 is a schematic representation of the operation of a single multi-layer structure.

With reference to the one-dimensional case, i.e. a single multi-layer structure as illustrated in FIG. 11, the wave front exiting from the multi-layer structure and incident in the collection plane of the diffraction figure in a point placed at an observation angle ϑd with respect to the optical axis of the device is described by the following equation (in the far field Fraunhofer approximation):

$$U(\lambda, \vartheta_d) = \frac{C \cdot A}{\lambda} \int_{\lambda_1}^{\lambda_2} U'(x, \lambda) \exp\left(-\frac{i 2\pi \sin(\vartheta_d) x}{\lambda}\right) dx$$

where C is a proportionality constant, A is the magnitude of the incident wave (which can depend on lambda), x is the transverse spatial coordinate, $\lambda_1$ and $\lambda_2$ are the lower and upper extremes of the spectral interval of interest.

In the equation provided above, $U'(x, \lambda)$ is the emerging near field distribution which, for a set of N waveguides becomes:

$$U'(x, \lambda) = \sum_{m=1,K,N} \exp\left(-\frac{i 2\pi}{\lambda} \cdot \frac{V_m L \gamma}{d}\right) \cdot \exp\left(-\frac{(x - mP - P/2)^2}{(W/2)^2}\right)$$

where, L is the length of the guides (which could also be different for each guide, Lm), d is the thickness of the guide layer, Vm is the voltage applied to each individual one of the N waveguides 50, γ is the electro-optical constant of the substrate according to orientation and material, P is the period of the ranks of waveguides 50 and W is the width of the waveguides themselves.

It is to be underlined that all these parameters are comprised in the design of the device according to the window of wavelengths to be used and the driving and programming logic.

It is clear that a predetermined distribution of the Vm, for predetermined and independent time intervals for each waveguide 50, modifiable, or dynamically reprogrammable through the use of conventional driving electronics (microcontroller, FPGA, graphics card, etc.) produces a far field diffraction figure in which both the diffraction angles (ϑd) and the colour components represent parameters that can be manipulated. In particular, the diffraction angles can be modified, and the colour components can be brought into constructive or destructive interference so as to select only the volute components (both as individual effects and combinations thereof).

For example, by determining and/or modifying the time intervals for the application of the voltage Vm to each individual one of the N waveguides 50, it is possible to direct in a temporally selective way the output communication channels (therefore switch them on or off at different predefined time intervals).

By exploiting the parameters that modify the emerging near field distribution it is possible to modify in space the diffraction figure and, therefore, the set of channels to which the output signal is physically sent, allowing the channels to be selectively switched on and off in groups or individually.

By exploiting both modes, it is possible to modify in real time the address protocols and redistribute in a smart way the data packages to the selected channels.

By determining and/or modifying the component connected with the wavelength of the emerging near field distribution, this component becomes a further form of channeling of the signal and therefore of the data transmitted, on which it is possible to act dynamically by varying in real time the distribution of the potentials administered to the device.

In the event that a polychromatic signal is sent to the device, then the diffraction figure produced can be dynamically reprogrammed in real time in its colour components and therefore in the spectral distribution of the input signals. From this point of view the device can also be used as a spectral filter that can be reprogrammed in real time. The use of the colour component then allows the generation of synthetic spectra that can be reprogrammed in real time, therefore able to simulate absorption spectra or emission spectra of arbitrary substances.

The reconfigurable integrated optical microswitch device 1 of the present invention allows all the characteristics of the input signal described above to be controlled simultaneously, both as a single characteristics and as a desired combination of the different characteristics listed.

The reconfigurable integrated optical microswitch device 1 of the present invention therefore enables a Programmable Waveguide Optical Circuit (PWOC) to be implemented on an electro-optical substrate 10. Moreover, the possibility of applying different and predetermined electric fields, and therefore of creating a different refractive index, on each waveguide 50, makes the photonic micro-device 1 of the present invention programmable as desired. The phase displacements in the different positions of the optical output signal, which have passed through the different waveguides 50, may be changed according to the required needs by modifying the distribution of the electric fields applied by each pair of electrodes 60, 70.

Therefore, unlike conventional devices which adopt static diffraction elements, the PWOC configuration of the present invention allows full control of the diffraction pattern produced by the diffracted light to be obtained.

The material with which the electro-optical substrate is made, and therefore the speed and the controllability of its refractive index, allow reaching extremely high switching frequencies, for example higher than 10 GHz, and, consequently, allow addressing and sorting large data streams transmitted on an optical signal in extremely short times. The implementation of the waveguides 50 through planar technologies typical of the MEOS sector allows applying batch production processes capable of making dozens of reconfigurable integrated optical microswitch devices 1 according to the present invention on each processed electro-optical substrate 10, thus optimizing the scale production.

The control of the refractive index of each waveguide 50, through the application of predetermined electric fields through the electrodes 60, 70 allows electronically and therefore quickly and accurately controlling and modifying the redistribution and splitting activity of the reconfigurable integrated optical microswitch device.

According to a particularly advantageous feature of the present invention, the reconfigurable integrated optical microswitch device 1 is particularly adapted to be connected to a processing unit. Said processing unit is capable of determining a predetermined distribution of electrical potentials on the waveguides 50 to set the respective refractive indices thereof and determine the necessary phase changes in the incident electromagnetic field. In this way, the electromagnetic radiation will generate the desired final diffraction figure, for an assigned direction in the far field region.

The electronic control of the operation of the reconfigurable integrated optical microswitch device 1 of the present invention also makes it programmable with conventional computer techniques and makes it dynamically reconfigurable.

Due to the above features, the reconfigurable integrated optical microswitch device 1 of the present invention may be directly interfaced with other devices using known interfaces used in optical networks.

Last but not least, the reconfigurable integrated optical microswitch device 1 of the present invention is characterized by a very low consumption as it avoids the conversion of the light signal into electronic signal and vice versa, unlike known devices.

All the details can be replaced with other technically-equivalent elements. Likewise, the materials used, and the contingent shapes and sizes, may be any according to the requirements but without thereby departing from the scope of protection of the following claims.

The invention claimed is:

1. A reconfigurable integrated optical microswitch device comprising:
    a base layer,
    an adhesive layer made of non-conducting material,
    a first layer of driving electrodes arranged above the non-conducting adhesive layer,
    a layer of electro-optical material arranged above the layer of driving electrodes,
    a plurality of waveguides obtained in the layer of electro-optical material,
    a second layer of driving electrodes, arranged above the layer of electro-optical material, and connected to the plurality of waveguides, and
    a layer of dielectric insulating material arranged between the layer of electro-optical material and the second layer of driving electrodes,
    wherein the layer of electro-optical material comprises an upper planar surface, and
    wherein the waveguides are arranged, adjacent to each other and distanced from one another, at the upper planar surface of the layer of electro-optical material, each one of the waveguides comprising an input end, an output end, at least two side walls, and an upper wall.

2. The reconfigurable integrated optical microswitch device according to claim 1, wherein the layer of dielectric insulating material comprises a plurality of openings arranged at the waveguides of the layer of electro-optical material.

3. The reconfigurable integrated optical microswitch device according to claim 2, wherein at least one of the layers of driving electrodes comprises a vertical driving line comprising a plurality of layers of conducting material arranged on the waveguides of the layer of electro-optical material, and a horizontal driving line comprising a plurality of conductive strips arranged on the layer of dielectric insulating material.

4. The reconfigurable integrated optical microswitch device according to claim 3, wherein an end portion of each conductive strip is arranged in one of the plurality of openings of the layer of electro-optical material and connected to a respective waveguide of the layer of electro-optical material.

5. The reconfigurable integrated optical microswitch device according to claim 1, wherein said waveguides are made by micro-machining the layer of electro-optical material in planar technology.

6. The reconfigurable integrated optical microswitch device according to claim 1, wherein a portion of said layer of electro-optical material is free from waveguides and comprises a pair of electrodes.

7. The reconfigurable integrated optical microswitch device according to claim 1, further comprises a plurality of multi-layer structures, each composed of a plurality of layers, arranged on top of each other so that each base layer of a multi-layer structure is arranged on the upper surface of a second multi-layer structure.

8. A switching method of an optical signal, comprising:
arranging a substrate of electro-optical material comprising an array of waveguides, a first and a second layer of driving electrodes connected to the waveguides, and a layer of dielectric insulating material arranged between the layer of electro-optical material and at least the first or the second layer of driving electrodes, wherein the layer of electro-optical material comprises an upper planar surface, and wherein the waveguides are arranged, adjacent to each other and distanced from one another, at the upper planar surface of the layer of electro-optical material, each one of these waveguides comprising an input end, an output end, at least two side walls, and an upper wall,
simultaneously distributing an optical signal through said array of waveguides; and
predetermining and applying an electrical potential value on each waveguide for modifying the respective refraction index, thereby generating a plurality of individual wave fronts that are offset from each other according to a first predetermined configuration.

9. The switching method of an optical signal, further comprising varying in real time the electrical potential value applied on each waveguide, thereby generating a plurality of single wave fronts offset from each other according to a second predetermined configuration.

* * * * *